3,767,738
METHODS OF PRILLING SULFUR FOR TRANSPORTING THROUGH A PIPELINE

Anthony G. Fonseca and Richard L. Every, Ponca City, Okla., assignors to Continental Oil Company, Ponca City, Okla.
No Drawing. Filed Oct. 20, 1971, Ser. No. 191,128
Int. Cl. B01j 2/06
U.S. Cl. 264—7     6 Claims

ABSTRACT OF THE DISCLOSURE

The present invention relates to an improved method of prilling sulfur for transporting in a pipeline with a minimum of sulfur precipitation and adherence to the internal parts of the pipeline system. The improvement comprises the prilling of sulfur into a polyhydroxy compound or aqueous mixtures thereof to form a protective coating on the surfaces thereof to inhibit the degradation caused by the physical treatment given same by the movement through the pipeline as well as the chemical attack by the carrier fluid.

---

The present invention relates generally to an improved method of prilling sulfur for transporting in a pipeline and, more particularly, to the prilling of sulfur for transport through a pipeline in the form of a pumpable slurry.

It has been previously proposed to transport sulfur between locations separated by substantial distances by pipeline. More specifically, the formation of a pumpable slurry which may be pumped through a pipeline linking two locations has been proposed. Such pipeline transport is used to move sulfur as well as the carrier fluid from sites where sulfur is produced or stockpiled and the carrier fluid is available from refineries or other processing plants; however, the continuing problem encountered in the transport of sulfur slurries by pipeline has been the propensity of the sulfur to precipitate and adhere to the internal parts of the pipeline system, particularly valves and fittings. This precipitation or plating-out seriously reduces the operational efficiencies of the pipeline system, requiring increased maintenance and causes contamination of the pipeline to a degree which presents serious problems if it is desired to use the same pipeline for transporting other materials in a relatively high state of purity.

The present invention provides an improved method for prilling sulfur and thereafter transporting the pellets in a pipeline wherein a minimum of precipitation and adherence of the sulfur in the internal parts of the pipeline system is encountered. A method of transporting sulfur by pipeline is disclosed in a copending application, Ser. No. 104,179, filed Jan. 5, 1971, having the same assignee as the present application wherein sulfur is prilled to form sulfur pellets, said pellets are combined in a carrier fluid to form a pumpable slurry for transporting through a pipeline. The present invention constitutes an improvement of prilling sulfur over the method disclosed in said copending application in that the pellets undergo less precipitation of sulfur and adherence thereof to the internal parts of a pipeline while transporting a slurry of the pellets therethrough.

Therefore, it is an object of the present invention to provide the art with an improved method of prilling sulfur for transporting the pellets thereof in a pipeline.

A further object of the present invention is the provision of an improved method of prilling sulfur wherein a minimum quantity of sulfur precipitates and adheres to the internal parts of a pipeline system carrying same.

Another object of the present invention is to provide the art with an improved method of prilling sulfur whereby in a pumpable sulfur slurry of pellets for transporting through a pipeline is formed having superior handling characteristics.

These and other objects of the present invention will become apparent from a reading of the following description.

It has now been found that the objects of the present invention can be attained in a method of prilling sulfur to form pellets thereof, and for transporting said pellets by pumping a slurry of said pellets through a pipeline by prilling the sulfur into a polyhydroxy compound to thereby obtain sulfur pellets having a protective coating on their surfaces to inhibit the degradation thereof while in transit.

In the operation of the improved method, to inhibit the degradation of sulfur pellets present in a slurry while in transit through a pipeline, the sulfur to be transported is prilled into a polyhydroxy compound media before slurrying with a suitable carrier fluid for transport. Upon drying, if an aqueous prilling media is employed, the sulfur pellets, having a protective coating on the surfaces thereof formed by the polyhydroxy compound, are introduced to a suitable carrier fluid to form a slurry having a sufficiently low viscosity such that the material can be pumped through a pipeline without difficulty. The carrier fluid is a fluid in which the sulfur is insoluble, or at least not soluble to a degree exceeding 5 weight percent. After formation of the slurry, it can be pumped through a pipeline over substantial distances, without the occurrence of sulfur precipitation or adherence to the internal parts of the pipeline to an unacceptable degree.

The present invention is based on the discovery that the tendency of sulfur to precipitate or plate out of sulfur pellets while transported through a pipeline in slurry form is largely caused by a combination of the physical treatment given the sulfur pellets by the pipeline system as well as the chemical attack on the sulfur pellets by the carrier fluid. The pellets of sulfur having a protective coating thereon formed by the polyhydroxy compound present a pellet which is protected from the effects of the pipeline system and the carrier fluid.

It is believed that the coating on the surface of the sulfur pellet takes place through the hydroxyl group of the polyhydroxy compound. The coating is a result of the chemical attraction of the sulfur for the oxygen of the —OH group coupled with the immiscibility of the coating material and the carrier fluid. In other words the protective effect is due to the greater attraction of the polyhydroxy groupings for the sulfur than for the hydrocarbon carrier. This protective effect is even necessary against carriers of low solubility (1% or less) because even if the saturation level of the solution is reached, the solid undissolved sulfur is constantly dissolving and going into solution and the dissolved sulfur is constantly precipitating as a powder or small crystals thereby constantly reducing the amount of prills or large particles.

In a specific, though non-limiting aspect of the present invention, the prilling of the sulfur is accomplished by heating the sulfur to form a molten stream thereof, forcing the stream of molten sulfur through a plurality of nozzles or orifices to form prills of the sulfur and injecting the molten prills directly into a suitable coating media, thereby coating and cooling the prills as they are formed. Natural thickening agents may be added to the coating media to increase the viscosity of the fluid and to facilitate the formation of the desired prills or pellets. The coating media both cools and coats the molten sulfur after passing through the prilling orifices to form prills or pellets having a protective coating on the surfaces thereof which inhibit the degradation thereof caused by the physical contact in the pipeline system and the chemical attack of the carrier fluid.

In forming the prills, the sulfur is melted and heated to a temperature of from about 130° C. to about 160° C. Below 130° C. the sulfur remains in solid form, and above 160° C. it becomes highly viscous and will not prill satisfactorily.

As the molten prills are injected into the coating media, which is preferably maintained at a temperature below about the melting point of sulfur, they are rapidly cooled and solidified causing a protective coating to form on the prills. The sulfur prills are then removed from the coating media in any suitable manner such as filtration and then placed into the carrier fluid to form a pumpable slurry.

In order for a protective coating to form on the sulfur prills which inhibits the degradation thereof while being transported through a pipeline in slurry form, it is necessary that the prilling media contain a polyhydroxy compound. The prilling media may consist of water containing at least 0.10% by weight of a polyhydroxy compound or a polyhydroxy compound alone. For economic reasons, it is preferable to use a prilling media having between 0.10% by weight to about 25% by weight of a polyhydroxy compound in water. It is important to note that when using an aqueous prilling media a drying step is needed prior to slurrying the sulfur prills in the carrier fluid.

Suitable polyhydroxy compounds to be useful in the present invention should be soluble in water, insoluble with carrier fluid, and contain more than one hydroxyl group. Suitable polyhydroxy compounds which are operative in the present invention include, for example, linear polysaccharides, soluble starch, ethylene glycol, propanediol, triethylene glycol, glycerol, sugar and fumed silica. Various other materials such as ketones and monoalcohols were investigated in regard to their utility as a prilling media herein but were found to be unsatisfactory due to their miscibility in carrier fluid.

Although water contains an hydroxyl group, it is not a suitable prilling media for the present invention because it evaporates and leaves no protective coating on the sulfur prills. Further, it should be noted that polyhydroxy compounds having a viscosity of greater than 500 centipoises cannot be utilized as the prilling media by themselves, but should be employed in an aqueous media in order for the protected sulfur prills to form correctly. For example, glycerol and triethylene glycol should only be used in an aqueous media to obtain the desired results.

As will be understood, the handling characteristics of the slurry formed from the above-described sulfur prills and carrier fluid selected can be varied by varying the size of the prills and the viscosity of the slurry. The prills may be as large as 2.5 inches in diameter and as small as 0.003 inch in diameter. However, the prills are preferably formed of an average diameter of from about 0.006 inch to about 0.25 inch.

The only significant limitation on the viscosity of the slurry used for transporting the sulfur is that it be sufficiently low to be pumpable. It is preferable, however, to assure ease of movement through the pipeline, that the horsepower requirements to pump the slurry through the pipeline not exceed 1.8 times the horsepower requirement to move the pure fluid carrier through the pipeline.

The type of fluid carrier employed is not particularly critical, but should be a non-solvent for sulfur, or at least dissolve the sulfur to no greater extent than 5 percent by weight. Transporting the sulfur in slurry form is advantageous in that the fluid carrier may be a material which is desirable to move from the origination of the sulfur shipment to the destination point. Since petroleum derivatives are frequently available near the sulfur deposits, particularly in the United States, preferred carrier materials include, but are not limited to such petroleum derived fluids as crude oils, sour crude oil condensates, sour gas condensates, crude oil distillates, kerosene and benzene.

The present invention can be better understood by referring to the following examples of its practice.

EXAMPLE 1

Laboratory tests were made which illustrate the improved results achieved by the method of the present invention.

Various prilling media were tested for their inhibiting effect on the degradation of sulfur prills by the movement of same through a pipeline as well as the chemical attack thereon by the carrier fluid.

Sulfur prills were prepared for a degradation test in the following manner. A two hundred (200) gram sample of molten sulfur (130°–160° C.) was inserted into the laboratory prilling apparatus which consisted of a stainless steel cylinder of 1" to 1¼" in diameter and 6 inches long in a metal heating block. A slight pressure of about 1 to about 6 p.s.i.g. was applied to one end of the cylinder which forced the molten sulfur through an orifice of from between ⅟₁₆ and ⅗₁₆ inch in diameter into the prilling media. The prilling media was agitated during the contacting with the sulfur. Thereafter, the thus formed sulfur prills were separated by filtration from the prilling media and dried in preparation for the degradation test.

Prior to the degradation test three of the above-prepared 200-gram samples of sulfur prills were combined and divided into two (2) equal parts by weight of approximately 300 grams each which were sieved into various sieve fractions and weighed. The following Tyler sieve fractions were utilized: 10 mesh, −10+20 mesh, 20+28 mesh, 28+35 mesh, and −35 mesh.

In conducting the degradation test, one of the above-prepared samples of sulfur prills of approximately 300 grams was formed into a 45 weight percent slurry of petroleum derivatives. The slurry sample was placed in a two inch in diameter cold-rolled steel tube ten inches long equipped with steel caps. Thereafter, the sample-containing tube was placed on a roller assembly which rotated the tube end over end at a rate of 66 revolutions per minute. Therefore, the flow rate of the slurry in the rotating tube was approximately one foot per second. Thus, the slurry came in contact with the sides of the tube but not not forced to remain in the ends of the tube by centrifugal force. The tube was thus rotated for about 72 hours and thereafter the slurry was removed and the sulfur prills separated from the petroleum derivatives by filtration and divided into fractions using the same sieves utilized prior to the degradation test. Each of the fractions were weighed for comparison with the fractions obtained and weighed prior to the degradation test. The percentage of degradation of the sulfur prills was calculated by subtracting the weight of the particles which passed through the −35 mesh Tyler sieve before the degradation test from the weight of the particles which passed through the −35 mesh Tyler sieve after the degradation test. The difference in weight obtained by the above calculation was then divided by the total weight of the sulfur prills prior to the degradation test to give a percentage of degradation. The results of these tests are given in Table I following.

TABLE I

| Prilling media | Weight percent prilling media in water | Percent degradation |
|---|---|---|
| Water | | 40 |
| Ethylene glycol | 25–50 | 7–16 |
| 1,2-propanediol | 50 | .5–22 |
| Glycerol | 79 | 5–11 |
| Triethylene glycol | 50 | 4–10 |
| Sugar | 20 | 6–13 |
| Soluble starch | 2.5 | 16 |
| Fumed silica | 3.75 | 13–20 |
| Linear polysaccharides | .5 | 11–20 |
| Ethylene glycol | Nonaqueous | 4–15 |

From the above data, it may be seen that the improved method of the present invention results in less degradation as compared to 100% aqueous prilling media.

EXAMPLE 2

Following the prilling procedure described in Example 1, a 259.3-gram sample of sulfur having been prilled in an aqueous media of 50% 1,2-propanediol was sieved and 34.6 grams of the sulfur particles passed the —35 mesh Tyler sieve. The total sample was thereafter slurried with a sour gas condensate and was thereafter tested following the procedure described in Example 1 relating to the degradation test. Upon termination of the degradation test the sulfur prills were separated from the sour gas condensate by filtration and again sieved wherein it was found that 40.4 grams of the particles passed a —35 Tyler sieve. By using the previously described calculation for percent of degradation shown in Example 1, it was found that the sulfur prills protected by a coating of 1,2-propanediol had a percent degradation of 2.3.

From the foregoing description of the invention it is apparent that an improved method for transporting sulfur in a pipeline is provided. Lower sulfur ratios in a pipeline result from a use of the improved method and in addition pipeline maintenance is decreased.

Although certain specific embodiments of the invention have been described as exemplary of its practice the examples are not intended to limit the invention in any way. Other process parameters and materials may be used in accordance with the broad principles outlined herein and when so used are deemed to be circumscribed by the spirit and scope of the invention except as necessarily limited by the appended claims or reasonable equivalents thereof.

Therefore, we claim:

1. In a method of prilling sulfur to form pellets thereof, and for transporting said pellets by pumping a slurry of said pellets through a pipeline, in order to inhibit the degradation of said pellets while in transit, the improvement consists essentially of:

(a) introducing molten sulfur into a liquid comprising a polyhydroxy compound soluble in water, having more than one hydroyl group and having a viscosity of less than 500 centipoises, and
   (b) forming pellets from said molten sulfur in said liquid and forming therein a protective coating on the surface of said pellets.

2. The improvement of claim 1 wherein said polyhydroxy compound contains a thickening agent.

3. The improvement of claim 1 wherein said polyhydroxy compound is selected from the group consisting of ethylene glycol and propanediol.

4. In a method of prilling sulfur to form pellets thereof and for transporting said pellets by pumping a slurry of said pellets through a pipeline, in order to inhibit the degradation of said pellets while in transit, the improvement comprises:

(a) introducing molten sulfur into a aqueous solution of a polyhydroxy compound having more than one hydroxyl group,
   (b) forming pellets from said molten sulfur in said aqueous solution and forming therein a protective coating on the surface of said pellets, and
   (c) drying said formed pellets prior to forming a slurry thereof.

5. The improvement of claim 4 wherein said aqueous solution contains at least 0.10 percent by weight of said polyhydroxy compound.

6. The improvement of claim 4 wherein said polyhydroxy compound is selected from the group consisting of linear polysaccharides, soluble starch, ethylene glycol, propanediol, triethylene glycol, glycerol and sugar.

References Cited

FOREIGN PATENTS 791,603   8/1968   Canada _____ 264—13

ROBERT F. WHITE, Primary Examiner

J. R. HALL, Assistant Examiner